United States Patent [19]
Gessaroli et al.

[11] 3,746,969
[45] July 17, 1973

[54] THREE-PHASE POWER CONTROL AND PHASE SHIFTER THEREFOR

[75] Inventors: Joseph Gessaroli, Danbury, Conn.; Stanley S. Brody, Tappan, N.Y.

[73] Assignee: The United States of America as represented by the Secretary of the Navy, Washington, D.C.

[22] Filed: Feb. 3, 1972

[21] Appl. No.: 223,097

[52] U.S. Cl. ...... 323/22 SC, 307/252 N, 307/252 T, 307/262, 323/24, 323/34, 323/38
[51] Int. Cl. .............................................. G05f 5/00
[58] Field of Search ............... 323/22 SC, 24, 34, 323/38, 39, 40; 321/5, 40; 307/252 B, 252 N, 252 T, 262, 293

[56] References Cited
UNITED STATES PATENTS

| | | | |
|---|---|---|---|
| 3,332,008 | 7/1967 | Mueller et al. | 323/22 SC |
| 3,437,911 | 4/1969 | Gutzwiller | 323/24 X |
| 3,434,039 | 3/1969 | Misencik | 323/22 SC |

Primary Examiner—Gerald Goldberg
Attorney—Richard S. Sciascia, John W. Pease et al.

[57] ABSTRACT

A three phase electrical power control circuit wherein three, ganged potentiometers are utilized to provide selectively phase shifted signals which are squared, differentiated and coupled by emitter followers to transformers for driving the silicon controlled rectifiers through diodes to pass power current only during selected portions of power current cycles.

4 Claims, 1 Drawing Figure

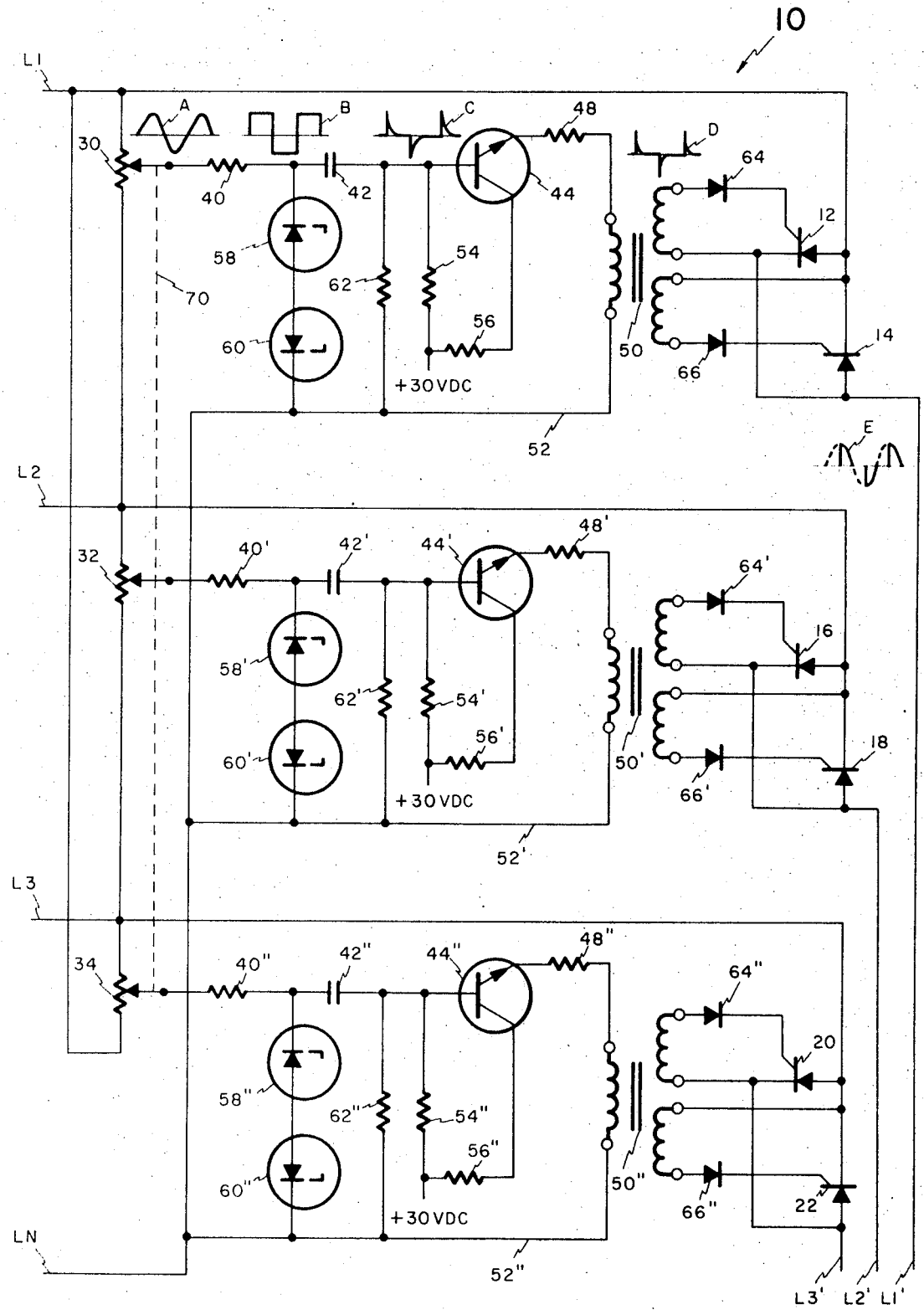

3,746,969

THREE-PHASE POWER CONTROL AND PHASE SHIFTER THEREFOR

BACKGROUND OF THE INVENTION

This invention relates to electrical control circuits, and more particularly to an improved three phase power control circuit. There are numerous situations, wherein it is highly desirable to control large amounts of AC power. Particularly is this true in Radar Modulator Transmitter, where the power driving the magnetron may be varied by control of the input power. The control must be performed on a three phase line, rather than single phase because of power distribution and balancing problems. Some schemes to do this involve three phase variacs weighing possibly 18 pounds for 600 watt power and being approximately 1 ½ ft. long by 4 inches in diameter. A possible replacement for this unit might consist of a magnetic amplifier weighing, for the same power, about 10 pounds and one-half the cubic volume. Both units, however, are too heavy and if smaller units could be developed would be highly desirable. With the advent of silicon controlled rectifiers as manufactured by various companies, means became available for controlling large amounts of power with small packages.

The silicon controlled rectifier acts in a manner similar to a gas thyratron in that the unit conducts upon the initiation of a pulse to the control electrode during the positive side of the sine wave, and is extinguished during the negative side. The major task in utilizing silicon controlled rectifiers in a three phase power control circuit is to develop control pulses which are displaced in time or phase from the three input phases by equal amounts.

Various circuits have been proposed including silicon controlled rectifiers for power control of three phase current. An example of these is U. S. Pat. No. 3,332,008 to D. A. Mueller, et al. However, all of these circuits are considerably complex, expensive, and heavy.

SUMMARY OF THE INVENTION

With the foregoing in mind it is a principal object of the invention to provide an improved three phase power control circuit which utilizes silicon controlled rectifiers yet avoids much of the complex, heavy, and expensive structure required heretofore to effect the desired control of three phase electrical power.

Another object of this invention is to accomplish the foregoing in an improved manner using ganged potentiometer means in combination with simple squaring and differentiating circuitry to select the portions of the input cycles during which power is to be passed by the silicon controlled rectifiers.

The invention may be further said to reside in certain novel combinations and arrangements of parts whereby the desired three phase power control is effected, as will be understood from the following description of the preferred embodiment when read in conjunction with the accompanying drawing.

BRIEF DESCRIPTION OF THE DRAWING:

The sole FIGURE is a schematic illustration of a three phase electrical control circuit embodying the invention.

DESCRIPTION OF THE PREFERRED EMBODIMENT

In the form of the invention illustrated in the drawing, and described hereinafter, a three phase power control circuit, generally indicated at 10, as its input is connected to receive conventional three phase electrical power via power lines L1, L2, and L3 each of which has impressed thereon a sinusoidal AC voltage with respect to a neutral line LN. The voltage carried by lines L1, L2, and L3 are, as is conventional in three phase systems, displaced in phase with respect to the adjacent lines by 120°.

The circuit 10 serves to variably control the power passed from the input lines L1, L2, and L3 to corresponding output lines L1', L2', and L3'. To this end the circuit comprises a pair of silicon controlled rectifiers connected between each input line and its corresponding output line, with the rectifiers of each pair oriented to pass current when appropriately biased, during portions of opposite half cycles of the voltage on the supply line concerned. Thus, line L1 is connected to the anode of a silicon controlled rectifier 12 and to the cathode of a silicon controlled rectifier 14, while the output line L1' is connected to the cathode of the rectifier 12 and to the anode of rectifier 14.

Similarly, line L2 is connected to the anode of a silicon controlled rectifier 16 and to the cathode of a silicon controlled rectifier 18, while the output line L2' is connected to the cathode of the rectifier 16 and to the anode of the rectifier 18. Line L3 is connected to the anode of a silicon controlled rectifier 20 and to the cathode of a silicon controlled rectifier 22, while output line L3' is connected to the cathode of the rectifier 20 and to the anode of the rectifier 22.

Control of the silicon controlled rectifier pair 12 and 14, the pair 16 and 18, and the pair 20 and 22 is effected by pulse forming circuitry comprising three potentiometers 30, 32 and 34, which have their resistance elements connected in delta with respect to the input lines L1, L2, and L3. That is, the resistance element of potentiometer 30 is connected between lines L1 and L2, that of potentiometer 32 is connected between lines L2 and L3, and that of potentiometer 34 is connected between lines L3 and L1.

The wiper of the potentiometer 30 is connected through an isolating resistor 40, and a capacitor 42 to the base of a transistor 44. The emitter of the transistor 44 is connected through a resistor 48 to one terminal of the primary winding of a transformer 50. The other terminal of that primary winding is connected by conductor 52 to the neutral line LN.

The base and the collector of the transistor 44 are respectively connected by biasing resistors 54 and 56 to a suitable source of DC potential, 30 volts positive in this example.

Connected back to back, or more accurately anode to anode, are a pair of zener diodes 58 and 60 connected from the junction between the resistor 40 and capacitor 42 to the neutral line LN via conductor 52. A resistor 62 is connected between the base of the transistor 44 and the conductor 52.

The transformer 50 comprises two separate secondary windings the first of which has one terminal connected through a diode 64 to the control electrode of the silicon controlled rectifier 12 and has its other terminal connected to the cathode of that silicon controlled rectifier. The other secondary winding of the transformer 50 has one terminal connected through a diode 66 to the control electrode of the silicon controlled rectifier 14 and has its other terminal connected to the cathode of that silicon controlled rectifier.

The wipers of the potentiometers 32 and 34 are each associated with circuit elements corresponding to those just described with respect to potentiometer 30. Accordingly the elements associated with potentiometers 32 and 34 are designated with numbers corresponding to the numbers designating corresponding parts associated with potentiometer 30 but with prime and double prime marks added respectively.

The wipers of the potentiometers 30, 32, and 34 are connected for ganged operation as indicated by dotted line 70, representative, for example, of a common shaft. Moreover, the wipers are arranged so that all are always similarly located with respect to their respective resistance elements. It will be appreciated that the voltages experienced at the wipers will be characteristic of sinusoidal alternating current, but will be displaced from 0° to 120° from the input thereto depending upon the wiper position. The voltage present at the wiper of representative potentiometer 30 is indicated by the waveform A.

This waveform A is squared by the action of the zener diodes 58 and 60 to provide a waveform B. The square waveform B is differentiated by the capacitance input R-C network including capacitor 42 and resistor 62 to form a train of spiked waveform as indicated at C.

The emitter follower circuit including transistor 44 provides a desirable impedance match to the input of the transformer 50, which provides a spiked output D to the diodes 64, 66. The latter pass pulses or spikes of alternate polarity, respectively, to turn on the associated silicon controlled rectifiers 12 and 14 at times which will pass current from line L1 to L1' having the characteristic voltage waveform E. The dotted portion of waveform E, of course, represents the voltage which is not passed. A similar train of events occurs with respect to each of the circuit portions associated with the potentiometers 32 and 34. The positions of the potentiometer wipers will control the ultimate phase relationship of the spike waveform D to the input voltage, and hence permits ready selection of the amount of output power available at the lines L1', L2', and L3'.

Because the potentiometers and other elements, including the various diodes, resistors, transistors, and transformers carry little current, they may be of light and inexpensive construction while effectively controlling the output power.

Obviously many modifications and variations of the present invention are possible in the light of the above teachings. It is therefore to be understood that within the scope of the appended claims the invention may be practiced otherwise than as specifically described.

What is claimed is:

1. A three phase control circuit of the type having three input power lines carrying alternating current with respect to a neutral line, an output line corresponding to each input line, and a pair of silicon controlled rectifiers each having a control electrode and each connected between one of said input lines and the corresponding output line with their respective anodes and cathodes in mutually opposite orientation, and a trigger pulse forming means for initiating conductivity of each associated pair of said silicon controlled rectifiers during selected portions of alternate voltage cycles on an associated of said supply lines, said circuit characterized by the improvement comprising:

first, second, and third potentiometer means for deriving a voltage signal which is proportional to the voltage on the associated input line;

first, second, and third wave squaring means coupled to the wipers of said first, second, and third potentiometer means, for providing first, second, and third trains of alternating square wave having voltage phase differing from that of the alternating current of the respective input lines;

first, second, and third differentiating means coupled to said first, second, and third squaring means, respectively, for forming first, second, and third trains of alternating, spiked waves;

first, second, and third emitter follower means coupled to said first, second, and third differentiating means respectively;

a diode connected to each of said control electrodes;

first, second, and third transformer means for coupling said first, second, and third emitter follower means through said diodes to said first, second, and third silicon controlled rectifier pairs to bias said rectifier pairs to pass only a selected portion each of a half-cycle of electrical current from each input to the respective output line.

2. A power control circuit, as defined in claim 1, and: said wipers of said first, second, and third potentiometer means being ganged for simultaneous operation to vary the selected portions of current passed to said output lines.

3. A power control circuit as defined in claim 2, and wherein:

said squaring means each comprises a plurality of zener diodes connected anode to anode in series between the respective potentiometer means wiper and said neutral line.

4. A power control circuit as defined in claim 3, and wherein:

said differentiating means each comprises a capacitor input R-C network.

* * * * *